R. KEMP.
ELECTRICAL HEATING APPLIANCE.
APPLICATION FILED FEB. 26, 1921.

1,411,663.

Patented Apr. 4, 1922.
2 SHEETS—SHEET 1.

Inventor
Robert Kemp
By his Attorney
Walton Harrison

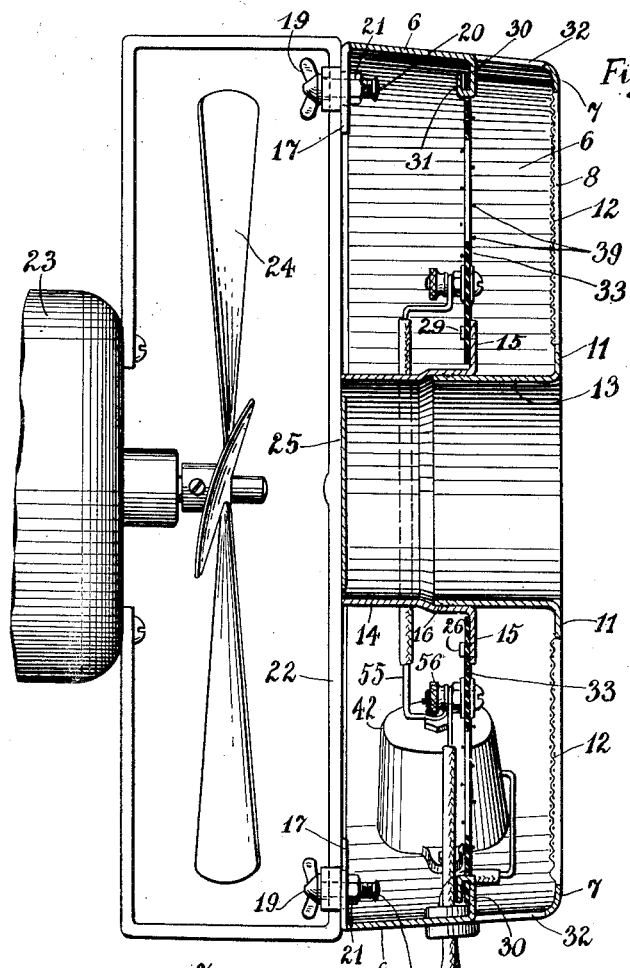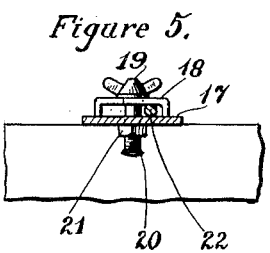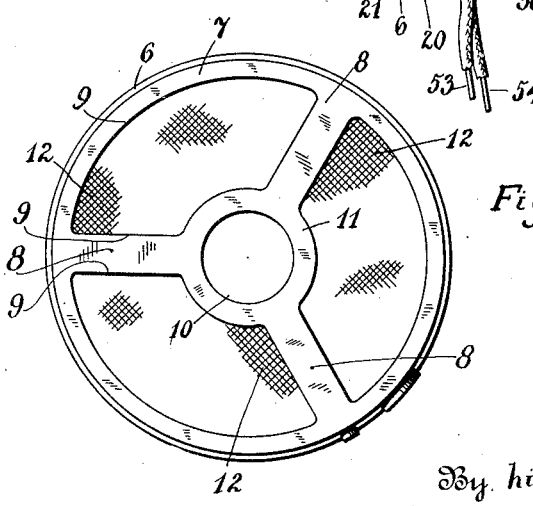

UNITED STATES PATENT OFFICE.

ROBERT KEMP, OF ELMHURST, NEW YORK, ASSIGNOR TO M. H. AVRAM & CO., INC., A CORPORATION OF MARYLAND.

ELECTRICAL HEATING APPLIANCE.

1,411,663. Specification of Letters Patent. Patented Apr. 4, 1922.

Application filed February 26, 1921. Serial No. 448,173.

*To all whom it may concern:*

Be it known that I, ROBERT KEMP, a citizen of the United States, residing in Elmhurst, county of Queens, and State of New York, have invented certain new and useful Improvements in Electrical Heating Appliances, of which the following is a full, clear, and concise description.

My invention relates to electrical heating appliances, and more particularly to such appliances when used for heating currents of air.

More particularly stated, my invention relates to electrical heating appliances used in connection with portable fans, and employed for the purpose of heating the currents of air from said fan.

While my invention admits of general use, it is of especial value as employed in connection with the form, aggroupment, relative arrangement, and means for supporting of the heating units comprising the principal portion of the electric heater, as used with the fan.

Reference is made to the accompanying drawings forming a part of this specification, and in which like reference characters indicate like parts throughout the several figures.

Figure 3 is a section on the line 3—3 of Figure 1, looking in the direction indicated by the arrows, and showing in addition the fan and certain parts immediately associated therewith.

Figure 4 is an elevation of the casing and its grating.

Figure 5 is a detail of the mechanism shown in Figures 1 and 3.

Figure 1:
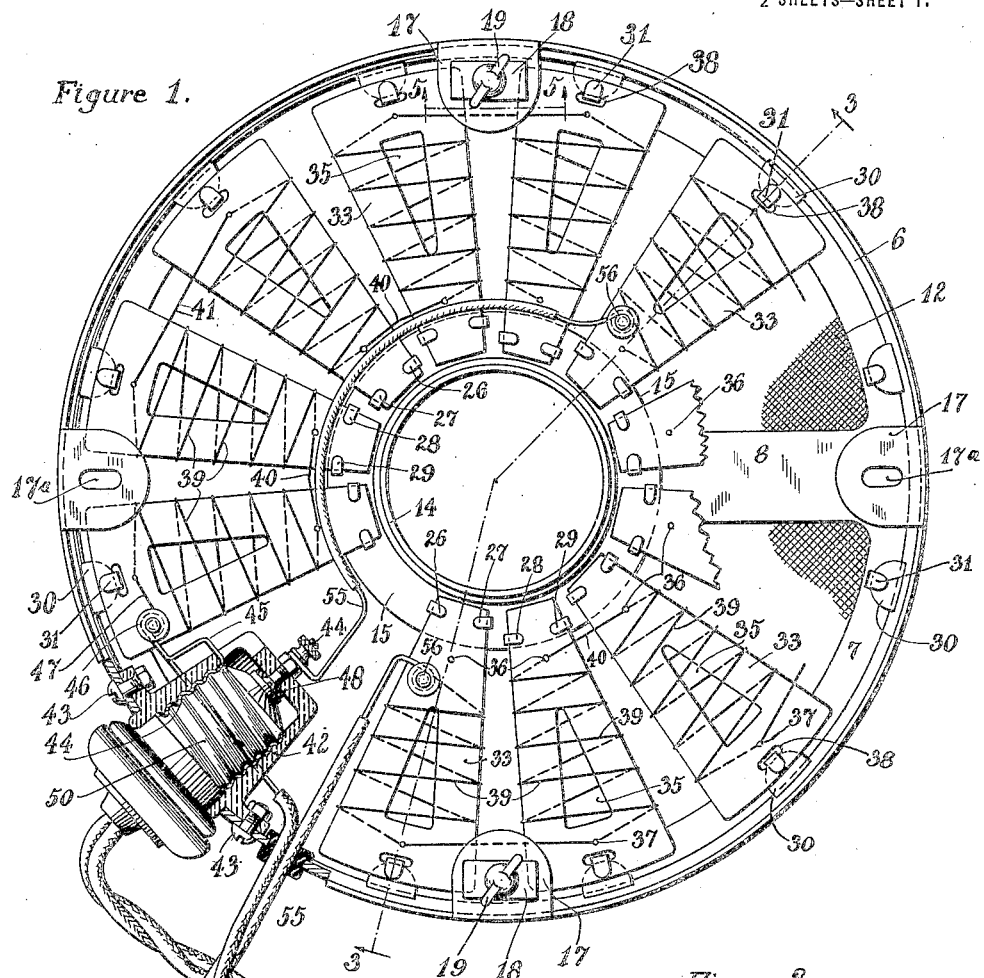
Figure 1 is a fragmentary view, partly in elevation and partly in section, of the heating unit and parts immediately associated therewith, together with the casing for supporting the same.

A casing is shown at 6, and is made of sheet material. The general shape of this casing is somewhat similar to that of an old fashioned cake pan. The casing is provided with openings 9, so formed as to leave radially extending ribs 8, in this instance three in number, having the form indicated in Figure 4. The casing is further provided with a centrally disposed opening 10 of circular form, so as to leave an annular member 11. Concentric with this annular member is a larger annular member 7. A grating 12 is so located within the casing as to cover the openings 9, as may be understood from Figures 3 and 4.

The casing 10 is further provided with an annular member 13 integral with it and concentric to its axis, as may be understood from Figure 3. Another annular member 14 encircles the adjacent portion of the annular member 13, and is provided with a flat annular flange 15, extending outwardly and occupying a plane crossing the axis of the annular member 13. The annular members 13, 14 are secured rigidly together by a joint 16, made preferably by spot welding. The two annular members 13, 14, thus secured together, constitute collectively a tubular member provided with the flat annular flange 15.

The casing 6 is also provided with ears 17 each ear having a slot 17ª and being bent as indicated in Figures 1 and 3. In this particular instance four of these ears are shown, but the number actually used may be two, three or four, as occasion may require.

Engaging each ear 17 is a small clamping plate 18, having the form indicated more particularly in Figure 5. This clamping plate is provided with a hole, through which extends a wing bolt 19, provided with an expanded tip 20 and extending through the slot 17ª. The wing bolt is threaded as indicated in Figure 5, and fitted upon it is a jam nut 21.

A supporting member 22, made in this instance of stout wire, is held in position by two clamping plates 18. By turning the wing bolts 19 the pressure of the clamping plates 18 upon the supporting member 22 may be varied at the will of the operator.

The supporting member 22 carries a motor 23 and a fan 24, for the purpose of forcing air through the casing 6.

A plate 25, mounted upon the supporting member 22, practically obstructs the adjacent portion of the tubular member comprising the annular members 13, 14. The plate 25 is a baffle plate for preventing air from passing through the casing without being heated as hereinafter described.

The wing bolts 19 can not readily become detached from their fittings, owing to the fact that the expanded tips 20 prevent them from working out, as may be understood from Figure 5.

The annular flange 15 is provided with tongues 26, 27, 28, 29. These tongues are arranged in pairs, as indicated in Figure 1. First there is a pair of tongues 26, 27, these tongues extending toward each other; and then, a little further outward is another pair of tongues 28, 29, also extending toward each other. Thus the several pairs of tongues 28, 29 are a little further from the center than is the case with the several pairs of tongues 26, 27. The various pairs of tongues 26, 27 may be considered as grouped roughly into the form of a circle, and the various pairs of tongues 28, 29 may be considered as similarly grouped into another circle of slightly larger diameter. By this arrangement the pairs of tongues 26, 27 are staggered relatively to the pairs of tongues 28, 29, so that the strength of the annular flange 15 is conserved to better advantage than would ordinarily be the case. In the arrangement just described no two of the tongues are crowded so closely together as to unduly reduce the strength of the adjacent portion of the annular flange 15.

The casing 6 is also provided with a number of tongues 30 integral with it and each having a comparatively narrow portion 31 bent backwardly or outwardly, as indicated in Figure 3. Each tongue 30 with its reverting portion 31 constitutes practically a hook, and in its entirety is struck or stamped out of the sheet metal of the casing, so as to leave openings 32. The tongues 30 are in substantially the same plane as the annular flange 15, as may be understood from Figure 3.

Figure 2:
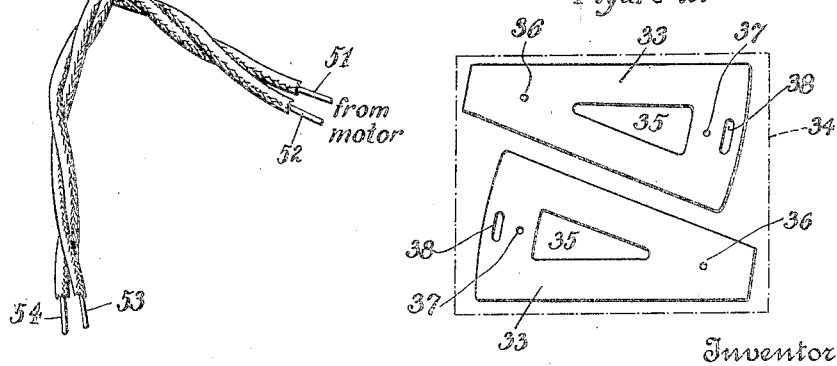
Figure 2 is a detail, showing in full and dotted lines the manner of making the mica sectors forming part of the heating units.

I provide a number of flat cores 33, each made of sheet mica. These cores can be continuously stamped or pressed from small sheets 34, of sheet mica, as indicated by dotted lines in Figure 2. Each core 33 is provided with a substantially central opening 35, having the proximate form of a triangle. Each core is further provided with two holes 36, 37, disposed adjacent its ends and with a slot 38, located between the hole 37 and the adjacent end portion of the core.

Each core 33 carries a winding 39 of resistance wire adapted to be heated by the passage of an electric current through the winding. Connecting wires 40, 41 are used for connecting up the windings with each other.

In order to mount the cores in position they are placed within the casing as indicated in Figure 1. First the tongues 31 are left extending upwardly, and the cores are so placed in position that each tongue 31 extends through a slot 38. This done the tongues 31 are bent outwardly, as shown in Figures 1 and 3. The inner or narrow end of each core 33 is thrust in between a pair of tongues 26, 27, or 28, 29, the tongues in question being bent downwardly upon it, as may be understood from Figure 1.

The casing 6 also carries a socket 42, held in position by bolts 43. The socket 42 is provided with a metallic threaded sleeve 44, and from the latter a wire 45 leads to a binding post 46, this binding post being by means of a short wire 47 connected with the nearest one of the resistance windings 39. The socket 42 is further provided with a contact member 48, and with a binding post 49 connected therewith. A screw plug 50, which may be of the usual construction, is fitted into the socket 42 and is adapted to coact therewith in the manner well known in this art. Connected with the screw plug 50 are a pair of insulated wires 51, 52.

Another pair of insulated wires are shown at 53, 54, and extend into the casing 6 through an eye 55 of insulating material. The wire 53 leads to a binding post 56 carried by one of the cores 33, and the wire 54 leads to the binding post 46 above mentioned.

Another wire 55 is connected with the binding post 49 carried by the socket 42, and with a binding post 56, with which one of the cores 33 is provided. The core provided with the binding post 56 is preferably located about halfway between the two cores serving as terminals for the heating elements.

The wires 51, 52 are connected with the electric motor 23, used for driving the fan 24. The supply wires are the wires 53, 54, and they may be connected with any wall plug or other convenient source of electrical supply, suitable for the purpose.

A circuit may be traced through the heating elements and parts immediately associated therewith, as follows:

Source of electricity (not shown), wire 53, binding post 56, through six heating units to the binding post 56; here the current divides, a portion passing through wire 55, binding post 49, contact member 48, wire 51, to electric motor 23, wire 52, sleeve 44, wire 45, binding post 46 and wire 54, back to source of supply.

Another circuit may be traced as follows:

Source of electricity (not shown), wire 53, binding post 56, then in series through all of the resistance units, to binding post 46, thence through wire 54 back to source of electricity.

The difference between the two circuits just traced is due to the action of the wire 55, which acts as a shunt for supplying a portion of the current to the electric motor 23. For this purpose the electric motor is supplied with a current having a resistance equal to that of one-half the total number of the resistance units, connected in series with each other.

If the plug 50 be removed, all of the current used will flow through all of the resistance units, in series with each other, but in this event no current is supplied to the electric motor 23, and as a consequence the fan is idle.

The improved heating unit forming a part of my invention presents a considerable number of distinct advantages. The mica cores are of such form that they can be made up either from good stock material or from scrap material more or less irregular in form, as desired. The mountings for the cores are quite strong and reliable, and yet they are made in the formation of the casing, so that no extra material is required, and no additional parts are needed, in their manufacture. In fact nearly all of the fastenings employed in the entire device are made from integral portions of the casing. The distribution of the various tongues and other parts used as fastening members is such as to conserve the sheet material, and to enable it to retain a maximum of its strength.

The separate heating units are readily accessible for purposes of inspection, repair and renewal. They are readily accessible as individual, separate units, or as a complete group of units. The several mica cores have each a considerable heating surface, so apportioned and located as to heat the air as far as practicable uniformly throughout. The openings 35, and the spaces between consecutive cores, are easily apportioned so that the cores will present just enough obstruction to the air current to baffle the air sufficiently for purposes of heating it uniformly throughout.

The form of the core is such that the resistance winding carried by the core is as far as practicable exposed uniformly to the cooling action of the air currents. In other words, the tendency is to enable practically all portions of the resistance winding to do equal amounts of work in heating the air.

I do not limit myself to the precise mechanism shown, as variations may be made therein without departing from my invention, the scope of which is commensurate with my claims.

Having thus described my invention, what I claim as new and desire to secure by Letters Patent is as follows:

1. In a device of the character described, the combination of a casing made of sheet material and provided with a substantially tubular portion and with a substantially circular portion of greater diameter than said tubular portion and concentric thereto, said circular portion being provided with a tongue of sheet material integral with it, and a heating unit provided at one of its ends with a slot for receiving said tongue in order to support said heating unit at the end thereof adjacent said tongue, and means for supporting the other end of said heating unit upon said substantially tubular portion.

2. In a device of the character described, the combination of a casing made of sheet material and provided with a substantially tubular portion and with a substantially circular portion of greater diameter than said substantially tubular portion, said substantially tubular portion being provided with a pair of tongues extending from it and made of sheet material, and a heating unit supported at one of its ends upon said substantially circular portion, the other of its ends being inserted between said pair of tongues and thus supported by said substantially tubular portion.

3. In a device of the character described, the combination of a casing provided with a substantially tubular portion and with a substantially circular portion of greater diameter than said substantially tubular portion, and a plurality of heating units located within said casing, each heating unit comprising a sector of insulating sheet material and a heating element wound upon said sector, the sector being supported at one of its ends by said substantially tubular portion and supported at its other end by said substantially circular portion.

4. In a device of the character described, the combination of a casing made of sheet material and provided with a tubular member and with a pair of tongues of sheet material extending from said tubular member, a heating unit located within said casing and comprising a core of insulating material and a heating winding carried by said core, said heating winding engaging said pair of tongues and being at one of its ends supported thereby, and means for supporting this other end from the casing.

5. In a device of the character described, the combination of a casing provided with a substantially tubular member located centrally thereof, said substantially tubular member having an annular flange and having tongues integral with said flange and arranged in pairs, and a plurality of heating units each comprising a core of insulating material and a winding carried by said core, each core being supported in part by a pair of said tongues.

6. In a device of the character described, the combination of a casing provided with a substantially tubular member, the tubular member having a flange of sheet material of annular form extending from it and provided with tongues arranged in pairs, the tongues of one pair being staggered relatively to the tongues of another pair in order to conserve the strength of the material of the annular flange, and a plurality of heating units each comprising a core of sheet material and a winding carried by said core, each core being supported in part by one pair of said tongues.

7. A heating unit comprising a single piece of sheet mica having the general form of a sector and provided with a substantially central opening, said piece of sheet mica being further provided with a pair of oppositely disposed ends and with holes located adjacent said ends, and a winding carried by said piece of sheet mica and provided with portions extending through said holes.

8. A device of the character described, comprising a motor, a supporting member secured thereto and having the form of a stout wire, a casing provided with ears adapted to be engaged by said supporting member, clamping plates for pressing said supporting member against said ears, wing bolts for forcing said clamping plates against said supporting member, and means for connecting said wing bolts with said ears.

9. In a device of the character described, the combination of a casing made of sheet metal and provided with tongues integral with it, a tubular member carried by said casing and provided with an extending portion having the form of an annular flange, said flange being provided with tongues integral with it, and a number of heating units grouped about said tubular member and extending radially outward, each heating unit resting at one of its ends upon said flange and being engaged by a pair of said last mentioned tongues, and resting at its opposite end upon one of said first mentioned tongues.

10. In a device of the character described, the combination of a substantially circular casing and a plurality of heating units mounted upon said casing and extending radially inward therefrom, each heating unit comprising a core of sheet material having the general form of a flat sector, and a resistance member wound around said sector.

11. In a device of the character described, the combination of a casing made of sheet material and provided with tongues integral with said sheet material and partially severed therefrom, and a plurality of heating units connected with said tongues and extending radially inward from said casing.

12. A heating unit comprising a sector of sheet mica serving as a core, and a resistance winding encircling said sector and supported thereby.

13. A heating unit comprising a sector of insulating sheet material, said sector being provided with an opening of approximately triangular form, and a heating winding mounted upon said sector and extending across said opening.

14. A heating unit comprising a core of sheet mica having the proximate form of a sector and provided with an opening, and a heating winding mounted upon said core and extending across said opening.

15. A heating unit comprising a core made of sheet mica and having the form of a sector, said core being provided with holes extending through it, and a heating member wound upon said core and extending through said holes.

16. A heating unit comprising a core made of sheet insulating material and having the form of a sector, said core being provided with a slot for facilitating its support in a heating apparatus, and further provided with holes, and a heating member wound upon said core and extending through said holes.

17. A heating unit comprising a pair of annular casing members one of which is concentric to the other, each of said casing members being provided with tongues, a plurality of heating members each extending from one of said casing members to the other and engaging said tongues, each heating unit comprising a core made of sheet material, and a heating member wound upon said core of sheet material.

18. A device of the character described comprising a heating unit, a plurality of said sectors extending inwardly from said casing, a heating winding carried by each sector and extending through said holes therein.

ROBERT KEMP.